United States Patent [19]

Eisenhart et al.

[11] Patent Number: 5,652,289
[45] Date of Patent: Jul. 29, 1997

[54] METHOD FOR MAKING AN AQUEOUS EMULSION POLYMER

[75] Inventors: Eric Karl Eisenhart, Doylestown; Bradley Anson Jacobs, Chalfont, both of Pa.

[73] Assignee: Rohm and Haas Company, Philadelphia, Pa.

[21] Appl. No.: 540,682

[22] Filed: Oct. 11, 1995

Related U.S. Application Data

[63] Continuation of Ser. No. 282,930, Jul. 29, 1994, abandoned.

[51] Int. Cl.$^6$ ............................................. C08K 5/06
[52] U.S. Cl. ........................... 524/376; 524/459; 524/736
[58] Field of Search ........................... 524/376, 547, 524/459, 736

[56] References Cited

U.S. PATENT DOCUMENTS

| | | |
|---|---|---|
| 3,316,198 | 4/1967 | Van Gorder et al. . |
| 3,365,410 | 1/1968 | Wesslau et al. . |
| 3,668,170 | 6/1972 | Maruta et al. . |
| 3,708,388 | 1/1973 | Lindermann et al. . |
| 3,755,237 | 8/1973 | Isaacs et al. . |
| 4,018,732 | 4/1977 | Lakshmanan . |
| 4,020,029 | 4/1977 | Gorbunow . |
| 4,316,830 | 2/1982 | Mallon . |
| 4,322,516 | 3/1982 | Wiest et al. . |
| 4,617,343 | 10/1986 | Walker et al. . |
| 5,227,423 | 7/1993 | Ingle . |
| 5,348,993 | 9/1994 | Daeumer et al. . |

FOREIGN PATENT DOCUMENTS

| | | |
|---|---|---|
| 1141895 | 2/1983 | Canada . |
| 1274644 | 9/1990 | Canada . |
| 2085206 | 6/1993 | Canada . |
| 1292883 | 11/1970 | United Kingdom . |

OTHER PUBLICATIONS

Handbook of Adhesives, Third Edition, Irving Skeist Ph.D., Skeist, Inc. Whippany, NJ, pp. 437–449.

*Primary Examiner*—Jeffrey T. Smith
*Attorney, Agent, or Firm*—Joseph F. Leightner

[57] ABSTRACT

A method for making a polymer, includes the step of polymerizing a mixture of a vinyl ester monomer, a $(C_1-C_{12})$alkyl (meth)acrylate monomer and a mono ethylenically unsaturated polar monomer by free radical initiated polymerization in an aqueous medium and in free presence of a colloidal stabilizer, a first poly(alkoxylated) alkyl phenol having less than or equal to 12 alkoxyl units per molecule and a second poly(alkoxylated) alkyl phenol having greater than 12 alkoxyl units per molecule, to form an emulsion of the polymer in the aqueous medium.

6 Claims, No Drawings

METHOD FOR MAKING AN AQUEOUS EMULSION POLYMER

This is a continuation of application Ser. No. 08/282,930, filed Jul. 29, 1994 now abandoned.

The present invention is directed to a method for making a polymer and, more specifically, to a method for making an aqueous emulsion of vinyl ester/acrylic polymer that is useful as a laminating adhesive composition.

Major portions of the laminating adhesives industry such as, for example, the construction adhesives industry, require a laminating adhesive to permanently bond a layer of a paper, metal or polymer film to a layer of a rigid substrate, for example, a layer of particleboard, plywood, hardboard, pressboard, chipboard, fiberboard or strandboard.

Present laminating adhesives cannot achieve a useful balance of coatability, high temperature performance and ambient temperature performance in a one-part adhesive composition.

A method for making a polymer is disclosed. The method includes the step of polymerizing monomers in an aqueous medium by free radical initiated polymerization, said monomers comprising:

from about 20 parts by weight to about 70 parts by weight of a vinyl ester monomer per 100 parts by weight of the monomers;

from about 30 parts by weight to about 80 parts by weight of a $(C_1-C_{12})$alkyl (meth)acrylate monomer per 100 parts by weight of the monomers; and from about 0.1 parts by weight to about 10 parts by weight of a monoethylenically unsaturated polar monomer per 100 parts by weight of the monomers;

in the presence of:

from about 0.1 parts by weight to about 15 parts by weight of a colloidal stabilizer per 100 parts by weight of the monomers;

from about 0.1 parts by weight to about 10 parts by weight of a first poly(alkoxylated) alkyl phenol per 100 parts by weight of the monomers, said first poly(alkoxylated) alkyl phenol having less than or equal to 12 moles of alkoxyl units per molecule; and from about 0.1 parts by weight to about 10 parts by weight of a second poly(alkoxylated) alkyl phenol per 100 parts by weight of the monomers, said second poly (alkoxylated) alkyl phenol having greater than 12 moles of alkoxyl units per molecule, to form an emulsion of the polymer in the aqueous medium, said polymer having a glass transition temperature from about −40° C. to about +15° C.

Polymers made by the method of the present invention provide good ambient temperature performance and high temperature performance as well as excellent coatability performance. As used herein, the term "coatability" means the ability of the adhesive composition to form a smooth, even film on a substrate when applied to the substrate at a commercially practicable processing speed.

The polymerization step of the process of the present invention is conducted in an aqueous medium and is initiated by a free-radical initiator according to known aqueous emulsion polymerization techniques. Suitable initiators include known peroxides, hydroperoxides, persulfates and azo initiators such as, for example, hydrogen peroxide, benzoyl peroxide, tert-butyl hydroperoxide, cumene peroxide, tert-butyl perbenzoate, tert-butyl diperphthalate and methyl ethyl ketone peroxide, ammonium persulfate, sodium persulfate, potassium persulfate, azodiisobutyronitrile and mixtures thereof. The initiator is preferably used at a level of from about 0.01 pbw to 3 pbw per 100 pbw total monomer charge. As used herein the terminology "total monomer charge" is used to denote the total amount of monomers introduced into the reaction vessel in the course of the polymerization reaction, regardless of the route of introduction. Thermal conditions or redox conditions using a reductant, such as, for example, sodium sulphoxylate formaldehyde, isoascorbic acid or sodium bisulfite, may be used to promote decomposition of the free radical initiator.

The vinyl ester monomer, $(C_1-C_{12})$alkyl (meth)acrylate monomer, monoethylenically unsaturated polar monomer, colloidal stabilizer, first and second poly(alkoxylated) alkyl phenols and initiator may each be separately introduced into the aqueous medium to thereby form a reaction mixture.

In a preferred embodiment of the process of the present invention, the initiator is added into the aqueous medium at a controlled rate as the polymerization step progresses.

In a preferred embodiment, the vinyl ester monomer, $(C_1-C_{12})$alkyl (meth)acrylate monomer and monoethylenically unsaturated polar monomer are added to the aqueous medium simultaneously in the form of a physical mixture that includes the monomers.

In a more highly preferred embodiment, the mixture of the monomers to be polymerized is added to the aqueous medium at a controlled rate as the polymerization reaction progresses.

Suitable vinyl ester monomers include, for example, vinyl acetate, vinyl propionate, vinyl neononanoate, vinyl neodecanoate, vinyl 2-ethylhexanoate, vinyl pivalate, vinyl versatate and mixtures thereof.

As used herein the terminology "$(C_1-C_{12})$alkyl" denotes an alkyl substituent group having from 1 to 12 carbon atoms per group and the terminology "(meth)acrylate monomer" refers collectively to acrylate monomers and methacrylate monomers. Suitable $(C_1-C_{12})$alkyl (meth)acrylate monomers include, for example, ethyl acrylate, butyl acrylate, 2-ethylhexyl acrylate, lauryl acrylate, methyl methacrylate, ethyl methacrylate, butyl methacrylate, isodecyl methacrylate, lauryl methacrylate and mixtures thereof. Preferably, the alkyl (meth)acrylate monomer is butyl acrylate, 2-ethylhexyl acrylate or a mixture thereof.

Suitable monoethylenically unsaturated polar monomers include, for example, $(C_1-C_8)$hydroxyalkyl (meth)acrylate monomers and monoethylenically unsaturated carboxylic acid monomers. As used herein, the terminology "monoethylenically unsaturated" means having a single site of ethylenic unsaturation per molecule and the terminology "$(C_1-C_8)$ hydroxyalkyl" denotes a hydroxyalkyl substituent group having from 1 to 8 carbon atoms per group. Suitable hydroxyalkyl (meth)acrylate monomers include, for example, hydroxyethyl acrylate, hydroxyethyl methacrylate, hydroxybutyl acrylate, hydroxypropyl methacrylate, 1-methyl-2-hydroxyethyl methacrylate and mixtures thereof. Suitable monoethylenically unsaturated carboxylic acid monomers include, for example, acrylic acid, methacrylic acid, itaconic acid, crotonoic acid, fumaric acid and mixtures thereof.

In a preferred embodiment, the monoethylenically unsaturated polar monomer is a monoethylenically unsaturated carboxylic acid monomer. More preferably, the monoethylenically unsaturated polar monomer is acrylic acid, methacrylic acid, itaconic acid or a mixture thereof. Most preferably the monoethylenically unsaturated polar monomer is acrylic acid.

In a preferred embodiment, the monomers to be polymerized include from about 1 part by weight to about 7 parts by weight monoethylenically unsaturated polar monomer per 100 parts by weight of the total monomer charge.

The monomer mixture may, optionally, include a small amount, for example, about 0.01 pbw to about 5 pbw, of a polyethylenically unsaturated monomer per 100 pbw total monomer charge, wherein the terminology "polyethylenically unsaturated" means having two or more sites of ethylenic unsaturation per molecule. Suitable polyethylenically unsaturated monomers include, for example, allyl (meth)acrylate, diallyl phthalate, 1,4-butylene glycol di(meth)acrylate, trimethylolpropane tri(meth)acrylate, divinyl ketone, N, N'-methylenediacrylimide, the polyallyl and polyvinyl ethers of pentaerythritol and mixtures thereof.

Optionally, an amount of up to about 20 pbw per 100 pbw total monomer charge of an olefin monomer, such as, e.g., ethylene, may be charged to the reaction vessel and copolymerized with the vinyl ester monomer and the alkyl (meth)acrylate monomer by, e.g., conducting the above-disclosed method in a pressurized reaction vessel and introducing an olefin monomer charge into the pressurized reaction vessel during the polymerization step.

Suitable colloidal stabilizers include, for example, hydroxyethyl cellulose, carboxymethyl cellulose, poly(vinyl alcohol), partially hydrolyzed poly(vinyl alcohol), fully hydrolyzed poly(vinyl alcohol), gum arabic and mixtures thereof.

Preferably, the colloidal stabilizer is selected from the group consisting of poly(vinyl alcohol), partially hydrolyzed poly(vinyl alcohol), fully hydrolyzed poly(vinyl alcohol) and mixtures thereof. As used herein, the terminology "poly (vinyl alcohol)" means poly(vinyl alcohol)s that are less than 85% hydrolyzed, the terminology "partially hydrolyzed poly(vinyl alcohol)" means poly(vinyl alcohol)s that are from 85% to 98% hydrolyzed, the terminology "fully hydrolyzed poly(vinyl alcohol)" means poly(vinyl alcohol)s that are more than 98% hydrolyzed, wherein the percent hydrolysis values are calculated on a molar basis. Preferably, the poly(vinyl alcohol), partially hydrolyzed poly(vinyl alcohol) and fully hydrolyzed poly(vinyl alcohol) each have a respective degree of polymerization of about 100 to about 600.

In a preferred embodiment, the monomers are polymerized in the presence of about 1 parts by weight to about 7 parts by weight of the colloidal stabilizer per 100 parts by weight total monomer charge.

The colloidal stabilizer may be added to the aqueous medium prior to addition of the monomers, may be added simultaneously with the monomers or may be added to the reaction mixture in two or more separate portions wherein each of the portions is added to the reaction mixture by a different route, for example, a portion of the colloidal stabilizer may be added to the aqueous medium prior to the addition of the monomers and the remaining portion added simultaneously with the addition of the monomers.

In a highly preferred embodiment, the colloidal stabilizer is added to the reaction mixture in two portions wherein a first portion of the colloidal stabilizer is added to the aqueous medium prior to addition of the monomers to the aqueous medium and the remaining portion of the colloidal stabilizer is added to the reaction mixture simultaneously with the monomers.

In a preferred embodiment, the first and second portions of colloidal stabilizer are each partially hydrolyzed poly (vinyl alcohol).

In an alternative preferred embodiment, one or both of the first and second portions of stabilizer is a mixture of partially hydrolyzed poly(vinyl alcohol) and fully hydrolyzed poly (vinyl alcohol).

Preferably, the first portion of the colloidal stabilizer includes from about 1 pbw to about 60 pbw, more preferably from about 1 pbw to about 10 pbw, colloidal stabilizer per 100 pbw of the combined amount of the first and second portions of the colloidal stabilizer.

The first poly(alkoxylated) alkyl phenol has less than or equal to 12, more preferably from about 5 to about 10, alkoxyl units per molecule. The alkoxyl units of the first poly(alkoxylated) alkyl phenol may each include from 1 to 4 carbon atoms per alkoxyl group and suitable alkoxyl groups include methoxyl, ethoxyl, propoxyl, butoxyl and mixtures thereof. The alkyl group of first poly(alkoxylated) alkyl phenol may include from 1 to 12 carbon atoms per alkyl group and suitable alkyl groups include, for example, methyl, ethyl, propyl, butyl, pentyl, hexyl, heptyl, octyl, nonyl, decyl, undecyl, dodecyl and mixtures thereof. Compounds suitable as the first poly(alkoxylated) alkyl phenol include, for example, poly(ethoxylated) octyl phenols, poly (propoxylated) nonyl phenols and poly(butoxylated) heptyl phenols having up to 12 alkoxyl units per molecule. In a preferred embodiment, the first poly(alkoxylated) alkyl phenol is a poly(ethoxylated) octyl phenol having from about 5 to about 10 ethoxyl units per molecule.

In a preferred embodiment, the monomers are polymerized in the presence of about 0.1 parts by weight to about 5 parts by weight of the first poly(alkoxylated) alkyl phenol per 100 parts by weight total monomer charge.

The second poly(alkoxylated) alkyl phenol has greater than 12, more preferably from greater than 12 to about 100, still more preferably from greater than 12 to about 20, alkoxyl units per molecule. The alkoxyl units of the second poly(alkoxylated) alkyl phenol may each include from 1 to 4 carbon atoms per alkoxyl group and suitable alkoxyl groups include methoxyl, ethoxyl, propoxyl, butoxyl and mixtures thereof. The alkyl group of the second poly (alkoxylated) alkyl phenol may include from 1 to 12 carbon atoms per alkyl group and suitable alkyl groups include, for example, methyl, ethyl, propyl, butyl, pentyl, hexyl, heptyl, octyl, nonyl, decyl, undecyl, dodecyl and mixtures thereof. Compounds suitable as the second poly(alkoxylated) alkyl phenol include, for example, poly(ethoxylated) octyl phenols, poly(propoxylated) nonyl phenols and poly (butoxylated) heptyl phenols having greater than 12 alkoxyl units per molecule. In a preferred embodiment, the second poly(alkoxylated) alkyl phenol is a poly(ethoxylated) octyl phenol having from greater than 12 to about 20 ethoxyl units per molecule.

In a preferred embodiment, the monomers are polymerized in the presence of about 0.1 parts by weight to about 5 parts by weight of the second poly(alkoxylated) alkyl phenol per 100 parts by weight total monomer charge.

The first and second poly(alkoxylated) alkyl phenols may each be added to the aqueous medium prior to addition of the monomers, may each be added to the reaction mixture simultaneously with the monomers or may each be added in two or more separate portions by different routes, for example, first portions of the respective first and second poly(alkoxylated) alkyl phenols may each be added to the aqueous medium prior to the addition of the monomers and second portions of the respective first and second poly(alkoxylated) alkyl phenols then added to the reaction mixture simultaneously with the addition of the monomers.

In a preferred embodiment, the first and second poly(alkoxylated) alkyl phenols are each added to the aqueous medium prior to addition of the monomers.

Optionally, an anionic surfactant or a nonionic surfactant may be used in addition to the colloidal stabilizer and the first and second alkoxylated alkyl phenol to stabilize the aqueous reaction mixture and the product emulsion. For example, up to about 5 pbw per 100 pbw total monomer charge of an anionic surfactant such as, for example, alkyl sulfates, alkyl sulfonates, alkyl phenol ethoxysulfates, monoalkyl sulfosuccinates or a mixture thereof, or up to about 10 pbw per 100 pbw total monomer charge of a nonionic surfactant other than the first and second poly(alkoxylated) alkyl phenols, such as, for example, alkylated acetylenic surfactants, poly(alkoxylated) acetylenic surfactants, poly(ethylene oxide/propylene oxide) block copolymers or a mixture thereof, may be used in addition to the colloidal stabilizer and first and second poly(alkoxylated) alkyl phenols.

The molecular weight of the polymer may, optionally, be controlled in a conventional manner using a chain transfer agent. For example, up to about 10 pbw, more preferably, up to about 0.75 pbw per 100 pbw total monomer charge, of a chain transfer agent, for example, a ($C_2$–$C_{20}$)alkyl mercaptan such as, for example, octyl metcaptan and dodecyl metcaptan, esters of mercaptopropionic acid such as, for example, methyl-3-mercaptopropionate and butyl-3-mercaptopropionate or a mixture thereof, may be introduced into the reaction vessel during the polymerization reaction. In a preferred embodiment, the chain transfer agent is dodecyl mercaptan or methyl-3-mercaptopropionate.

The polymer formed by the method of the present invention has repeating units derived from the respective monomers of the total monomer charge. The identity and relative amounts of those monomers are selected, according to methods known in the art, so that the polymer produced by polymerizing the monomers exhibits a glass transition temperature ($T_g$) in the desired range.

The $T_g$ of a polymer of a proposed composition may be estimated by methods known in the art such as, for example, by calculating the weighted average of the $T_g$ values for homopolymers derived front the respective monomers $M_1$, $M_2$, . . . $M_n$, of the reaction mixture, according to equation (1):

$$T_{g(copolymer)} = \sum_{i=1}^{n} w_i T_{gi} \quad (1)$$

wherein:

$T_g$(copolymer) is the glass transition temperature calculated for the copolymer $w_i$ is the weight fraction of monomer $M_i$ in the copolymer $T_{gi}$ is the glass transition temperature of the homopolymer of $M_i$.

The glass transition temperature of homopolymers may be found, for example, in "Polymer Handbook", edited by J. Brandrup and E. H. Immergut, Interscience Publishers.

In a preferred embodiment, the polymer has a $T_g$ of from about −35° C. to about 5° C., more preferably form about −30° C. to about 0° C.

When a carboxylic acid monomer is incorporated into the polymer made by the process of the present invention, the acid groups of the polymer may be partially or wholly neutralized. Preferred is neutralization of about 5% to 200% of the equivalents of copolymerized acid. More preferred is neutralization of about 5% to 100% of the equivalents of copolymerized acid. The copolymerized carboxylic acid groups may be neutralized with a nonvolatile base such that substantially all of the nonvolatile base remains in the adhesive composition during the drying process. The copolymerized carboxylic acid groups may be neutralized with inorganic or organic bases or with salts of bases with weak acids such as, for example, sodium formate, potassium lactate, sodium citrate, potassium acetate, and sodium carbonate.

In a preferred embodiment, the polymer is in the form of an aqueous emulsion that includes from about 30 wt % to about 70 wt %, more preferably about 45 wt % to about 60 wt %, polymer solids.

In a preferred embodiment, the polymer solids are in the form of particles of about 100 nanometers to about 10,000 nanometers in diameter.

In a preferred embodiment, the polymer emulsion has a viscosity of about 100 centipoise (cP) to about 10,000 cP, more preferably about 200 cP to about 7500 cP. The viscosity of the emulsion may be conveniently measured using a Brookfield viscometer, for example, using a Brookfield Model No. RVT viscometer equipped with a #3 spindle and operated at 20 revolutions per minute.

An adhesive composition includes from about 10 wt % to about 70 wt % of the polymer made by the method of the present invention dispersed in an aqueous medium and may, optionally, further include other additives known in the art such as, for example, plasticizers, emulsifiers, pigments, fillers, curing agents, thickeners, humectants, wetting agents, biocides, adhesion promoters, colorants, waxes and antioxidants.

The adhesive composition is useful for bonding substrates together. The adhesive composition is particularly useful for lamination of a plurality of substrate layers, that is, a bonding method wherein layer of the adhesive composition is applied to a first substrate layer, the adhesive layer is covered with a second substrate layer to form a laminated article wherein the two substrates are bonded together by the dried adhesive layer. In a preferred embodiment, the substrate layers are in the form of flat sheets of substrate material.

The adhesive composition may be applied to a substrate to be bonded by known techniques such as, for example, direct roll coating, reverse roll coating, wire-wound rod coating, knife coating, extrusion, slot die coating, wheel and pot coating, gravure printing and curtain coating.

The substrates may be bonded by wet lamination, that is, wherein the second substrate is applied over a wet layer of adhesive and the adhesive layer is subsequently dried to form the adhesive article.

Preferably, the adhesive composition is dried after it is applied to a first substrate and prior to application of the second substrate. The adhesive layer may be heated to effect drying. The duration and temperature of heating will affect the rate of drying, processability and handleability, and property development of the treated substrate. Heat treatment at about 30° C. to about 250° C. for a period of time between about 3 seconds to about 15 minutes may be carried out to effect the desired drying.

In an alternative embodiment, a layer of the adhesive composition is applied to one side of one of a pair of substrates or to one side of each of a pair of substrates and dried. The substrates are then brought together with the adhesive layer or layers disposed between the substrates and the substrates are then compressed together and heated to form an adhesive bond between the substrates.

Suitable substrates include, for example, paper products such as papers and paperboards, wood, metal films, polymer films and composite substrates, that is, substrates consisting of a combination of dissimilar substrate materials such as polymer-coated paperboards, for example, wax-coated paperboard, particleboard, plywood, hardboard, pressboard, chipboard, fiberboard and strandboard.

In a highly preferred embodiment, the adhesive article comprises a layer of a paper, metal or polymer film bonded to a layer of a rigid substrate, for example, a layer of particleboard, plywood, hardboard, pressboard, chipboard, fiberboard or strandboard by an interposed layer of dried adhesive.

COMPARATIVE EXAMPLES C1–C3

The polymer of Comparative Example C1 was made by the following procedure. A stirred reactor containing 196.8 g. of deionized (D.I.) water was heated to 65 ° C. under nitrogen. Then 1.1 g of a 0.1 wt % aqueous solution of iron (II) sulfate, 4.0 g of a 20 wt % aqueous solution of partially hydrolyzed polyvinyl alcohol (Airvol 205), 12 g of a poly (ethoxylated) octyl phenol having 9 to 10 ethoxyl units per molecule (Triton X-100, Union Carbide) was added followed by a solution of 0.2 g of 30 wt % (in water) hydrogen peroxide in 2 g of DI Water. A monomer mixture was then fed to the reactor which consisted of: 220 g of DI water, 116 g of a 20 wt % solution of partially hydrolyzed polyvinyl alcohol (Airvol-205) in water, 376 g of vinyl acetate, 224 g of n-butyl acrylate, 160 g 2-ethylhexyl acrylate and 40 g of acrylic acid. The monomer mixture was fed over 165 minutes. At the same time as the monomer mixture feed, the following two solutions were cored: 1.6 g of 30 wt % hydrogen peroxide (in water) dissolved in 35 g of DI water and 0.8 g of sodium sulphoxylate formaldehyde dissolved in 36 g of DI water. These solutions were fed over 180 minutes to the reactor. At the completion of the hydrogen peroxide and sodium sulphoxylate formaldehyde feeds the reaction was cooled and 14.5 g of a 45 wt % aqueous solution of potassium acetate was added. The polymer of Example C1 had a solids content of 54.2%, a Brookfield viscosity (RVT viscometer, #3 spindle at 20 rpm) of 2250 cps., and a Tg (calculated) to be −4.8° C.

The polymer of Comparative Example C2 was prepared according to the procedure disclosed above in Example C1, except the following were added initially to the reactor: 4.0 g of a 20.2% solution of Airvol-205 (partially hydrolyzed polyvinyl alcohol) in water, 11.2 g of Triton X-100, 3.5 g of an anionic surfactant (Rhodapon DS-4), and 194.1 g of D.I. water. The polymer of Comparative Example C2 had a solids content of 53.0%, Brookfield viscosity (RVT viscometer, #3 spindle, 20 rpm) of 1,750 cps.

The polymer of Comparative Example C3 was prepared according to the method disclosed above in Comparative Example C2 except that different respective amounts of Triton X-100 and Rhodapon DS-4 were each added to the reaction mixture.

The polymer of Comparative Example C4 was prepared according to the method disclosed above in Comparative Example C2 except that different respective amounts of Triton X-100 was added to the reaction mixture and a nonionic acetylenic surfactant (Surfynol CT-121) was substituted for the Rhodapon DS-4 surfactant used in Comparative Example C2.

The relative amounts of surfactants (Triton X-100, Surfynol CT-121 and Rhodapon DS-4) added to the reaction mixtures of Comparative Examples C1–C4 are set forth below in Table 1, each expressed as parts by weight surfactant per 100 parts by weight total monomer charge.

EXAMPLES 1–13

The compositions of Examples 1–13 were prepared according to the method disclosed above in Comparative Example 1 except that different respective amounts of Triton X-100 were added to the reaction mixture and a poly (ethoxylated) octyl phenol having 16 ethoxyl units per molecule (Triton X-165, Union Carbide) was also added to the reaction mixture.

The relative amounts of surfactants (Triton X-100 and Triton X-165) added to the reaction mixtures of Examples 1–13 are set forth below in Table 1, each expressed as parts by weight surfactant per 100 parts by weight total monomer charge.

TABLE 1

| Sample # | Triton X-100 | Triton X-165 | Rhodapan DS-4 | Surfynol CT-121 |
|---|---|---|---|---|
| C1 | 1.5 | — | — | — |
| C2 | 1.4 | — | 0.1 | — |
| C3 | 1.49 | — | 0.01 | — |
| C4 | 1.4 | — | — | 0.6 |
| 1 | 0.9 | 0.6 | — | — |
| 2 | 1.0 | 0.6 | — | — |
| 3 | 1.2 | 0.3 | — | — |

TABLE 1-continued

| Sample # | Triton X-100 | Triton X-165 | Rhodapan DS-4 | Surfynol CT-121 |
| --- | --- | --- | --- | --- |
| 4 | 1.2 | 0.6 | — | — |
| 5 | 1.2 | 0.8 | — | — |
| 6 | 1.4 | 0.3 | — | — |
| 7 | 1.4 | 0.5 | — | — |
| 8 | 1.4 | 0.6 | — | — |
| 9 | 1.4 | 0.7 | — | — |
| 10 | 1.4 | 0.8 | — | — |
| 11 | 1.4 | 0.9 | — | — |
| 12 | 1.4 | 1.4 | — | — |
| 13 | 1.6 | 0.5 | — | — |

EXAMPLE 14

The coatability performance of the emulsions was evaluated using a Model 5C-14 direct roll coater (Union Tool Corp., Warsaw, Ind.) equipped with a 4-inch diameter rubber applicator roll (13 durometer-type A hardness) and a 2.75-inch diameter chrome doctor roll. The rolls were brought into contact such that the doctor roll lightly compressed the applicator roll. The rate of roll rotation was set at approximately 100 ft/minute as measured with a hand-held tachometer. While the rolls were rotating, enough emulsion (approximately 0.5 pint) was poured into the nip between the rolls such that a constant excess of emulsion was maintained in the nip.

Observations of coatability performance of the emulsion was rated on a scale of 1 to 5 (5 best) for three properties: film splitting, slinging, and ribbing. "Ribbing" refers to striations of emulsion formed around the rolls in a direction parallel to their direction of rotation. Descriptions of performance given poor and excellent ratings are presented below in Table 2. The scale for each property was based on a comparison to the performance of two control examples. The performance of an emulsion made according to the method of Comparative Example C1 was assigned a value of 2 and the performance of a commercially available aqueous vinyl ester/acrylic adhesive composition (HP-2931, Rohm and Haas Company, Philadelphia, Pa.) was assigned a value of 5.

TABLE 2

| Property | Poor (rating = 1) | Excellent (rating = 5) |
| --- | --- | --- |
| Film splitting | emulsion all on one roll | equivalent emulsion coat weights on two rolls |
| Slinging | emulsion streaming off rotating rolls | no droplets of emulsion thrown from rotating rolls |
| Ribbing | thick, irregular and highly variable striations | fine, even, closely spaced and regular striations |

The results of the coatability evaluation of the polymers of Examples 1–13 and Comparative Examples 1–4 and HP-2931 adhesive composition is set forth below in Table 3 as a numerical score of from 1 to 5 for each of the above-described respective splitting, slinging and ribbing tests according to the rating criteria set forth in table 2. The notation "nd" denotes that the results of a particular test were not determined.

TABLE 3

| Example # | Film Split | Slinging | Ribbing |
| --- | --- | --- | --- |
| 1 | 1 | 2 | 3 |
| 2 | 1 | 2 | 3 |
| 3 | 2 | 1 | 2 |
| 4 | 5 | 4 | 2 |
| 5 | 5 | 3 | 2 |
| 6 | 4 | 3 | 2 |
| 7 | 4 | 3 | 2 |
| 8 | 5 | 3 | 2 |
| 9 | 5 | 5 | 4 |
| 10 | 5 | 5 | 4 |
| 11 | 5 | 3 | 3 |
| 12 | 5 | 3 | 3 |
| 13 | 5 | 3 | 2 |
| C1 | 2 | 2 | 2 |
| C2 | 1 | 5 | nd |
| C3 | 1 | 5 | nd |
| C4 | 1 | 1 | nd |
| HP-2931 | 5 | 5 | 5 |

EXAMPLE 15

The performance of the polymer of Comparative Example C1 as an adhesive was compared to that of the polymer of Example 9 using the room temperature peel strength, high temperature peel strength and high temperature crosshatch test procedures set forth below.

Room Temperature Peel Test—The adhesive was coated onto a 3 inch×6 inch panel of birch plywood using a #38 wire wound rod. A 4 inch×14 inch piece of 6 mil sandwich vinyl (plasticized polyvinyl chloride(PVC)) was laminated onto the adhesive by pressing three times with a hand-held roller. The laminates were stacked and pressed overnight with a 10 pound weight. Two 1 inch peel strips were cut into each laminate. The strips were peeled using an Instron tensile tester at a 180° angle, using a 10 inch/minute peel rate. The average value (in pounds/linear inch (pli)) of a 6 inch peel was recorded for each strip. The peel values from three strips (from three different test panels) were averaged to give the final peel strength.

High Temperature Peel Test—Peel strips were prepared as described above for the room temperature adhesion test. The laminates were placed in a 150° F. oven and equilibrated for an hour. The samples were removed from the oven one at a time and tested immediately, while hot. One strip from each laminate was peeled using an Instron tensile tester at a 180° angle, using a 10 inch/minute peel rate. The average value (in pounds/linear inch (pli)) of a 6 inch peel was recorded for each strip. The peel values from three strips (from three different test panels) were averaged to give the final peel strength.

High Temperature Crosshatch Test—The adhesive was coated onto an approximately 3 inch×6 inch panel of birch plywood using a #38 wire wound rod. A 4 inch×14 inch piece of 6 mil sandwich vinyl was laminated onto the adhesive by pressing three times with a hand-held roller. The laminates were stacked and pressed overnight with a 10 lb. weight. An X was cut through the vinyl on the surface of each laminate using a razor blade. The laminates were placed in a 150° F. oven. The number of days until the underlying wood was visible through the X in the vinyl, caused by vinyl separation, was reported. In each case, the vinyl showed no separation after two weeks in the oven, at which time the test was halted.

The results of the room temperature and high temperature peel tests, each expressed as pounds force per linear inch (pli) and of the high temperature crosshatch test, expressed in days, are each set forth below in TABLE 4 for the polymers of Comparative Example 1 and Example 9.

TABLE 4

| Example # | Room Temp. Peel (pli) | High Temp. Peel (pli) | High Temp. Crosshatch (days) |
|---|---|---|---|
| C1 | 9.1 | 6.3 | greater than 14 |
| 9 | 10.0 | 7.1 | greater than 14 |

Polymers made by the method of the present invention provide good ambient temperature performance and high temperature performance as well as excellent coatability performance.

We claim:

1. A method for making a polymer comprising:
   polymerizing monomers in an aqueous medium by free radical initiated polymerization, said monomers comprising:
   from about 20 parts by weight to about 70 parts by weight of a vinyl ester monomer per 100 parts by weight of the monomers;
   from about 30 parts by weight to about 80 parts by weight of a ($C_1$–$C_{12}$) alkyl (meth)acrylate monomer per 100 part by weight of the monomers; and
   from about 0.1 parts by weight to about 10 parts by weight of a monoethylenically unsaturated polar monomer per 100 parts by weight of the monomer, in the presence of:
   from about 1.5 parts by weight to about 2.8 parts by weight of a colloidal stabilizer per 100 parts by weight of the monomers;
   from about 1.2 parts by weight to about 1.6 parts by weight of a first poly(alkoxylated) alkyl phenol per 100 parts by weight of the monomers, said first poly(alkoxylated) alkyl phenol having about 10 alkoxyl units per molecule; and
   from about 0.3 parts by weight to about 1.4 parts by weight of a second poly(alkoxylated) alkyl phenol per 100 parts per weight of the monomers, said second poly(alkoxylated) alkyl phenol having about 16 alkoxy units per molecule,
   to form an emulsion of the polymer in the aqueous medium, said polymer having a glass transition temperature from about −40° C. to about +15° C.;
   wherein the total weight of the first and second poly (alkoxylated) alkyl phenol is greater than about 1.8 parts per 100 parts per weight of the monomers.

2. The method of claim 1, wherein the vinyl ester monomer is selected from the group consisting of vinyl acetate, vinyl propionate, vinyl neononanoate, vinyl neodecanoate, vinyl 2-ethylhexanoate, vinyl pivalate, vinyl versatate and mixtures thereof.

3. The method of claim 1, wherein the ($C_1$–$C_{12}$)alkyl (meth)acrylate monomer is selected from the group consisting of ethyl acrylate, butyl acrylate, 2-ethylhexyl acrylate, lauryl acrylate, methyl methacrylate, ethyl methacrylate, butyl methacrylate, isodecyl methacrylate, lauryl methacrylate and mixtures thereof.

4. The method of claim 1, wherein the monoethylenically unsaturated polar monomer is a monoethylenically unsaturated carboxylic acid monomer.

5. The method of claim 4, wherein the monoethylenically unsaturated carboxylic acid monomer is acrylic acid, methacrylic acid, itaconic acid or a mixture thereof.

6. The method of claim 1, wherein the colloidal stabilizer is selected from the group consisting of poly(vinyl alcohol), partially hydrolyzed poly(vinyl alcohol), fully hydrolized poly(vinyl alcohol) and mixtures thereof.

* * * * *